United States Patent

Bäckström et al.

[19]

[11] Patent Number: 5,903,851
[45] Date of Patent: May 11, 1999

[54] RADIO LINK SHORT HOLD MODE FOR MOBILE CIRCUIT DATA APPLICATIONS

[75] Inventors: Martin Bäckström, Huddinge; Dick Andersson, Kista; Ulf Olsson, Sollentuna, all of Sweden

[73] Assignee: Telefonaktiebolaget L M Ericsson, Stockholm, Sweden

[21] Appl. No.: 08/943,497

[22] Filed: Oct. 3, 1997

[51] Int. Cl.[6] .................................................. H04Q 7/24
[52] U.S. Cl. ....................... 455/557; 455/445; 455/517; 455/516
[58] Field of Search .................................. 455/417, 422, 455/423, 424, 434, 445, 516, 560, 433, 466, 517, 443, 557; 370/354, 524, 346, 341, 329, 349, 389, 312, 324, 528

[56] References Cited

U.S. PATENT DOCUMENTS

| | | | |
|---|---|---|---|
| 4,539,676 | 9/1985 | Lucas | 370/354 |
| 4,718,062 | 1/1988 | Anderson | 370/354 |
| 4,837,800 | 6/1989 | Freeburg et al. | 455/557 |
| 5,309,442 | 5/1994 | Saeki . | |
| 5,383,187 | 1/1995 | Vardakas et al. . | |
| 5,499,243 | 3/1996 | Hall . | |
| 5,526,399 | 6/1996 | Kameda | 379/58 |
| 5,542,094 | 7/1996 | Owada et al. . | |
| 5,583,913 | 12/1996 | Taketsugu . | |
| 5,619,361 | 4/1997 | Sagesaka et al. . | |
| 5,633,872 | 5/1997 | Dinkins . | |
| 5,633,874 | 5/1997 | Diachina et al. | 370/346 |

FOREIGN PATENT DOCUMENTS

| | | |
|---|---|---|
| 0 789 499 A2 | 8/1997 | European Pat. Off. . |
| WO 95/08900 | 3/1995 | WIPO . |

OTHER PUBLICATIONS

*Networking For Supplementary Services Management* The GSM System, Communication Management, XP–002069784 pp. 299–305 and pp. 556–563.

*Primary Examiner*—Wellington Chin
*Assistant Examiner*—Yemane Woldetatios
*Attorney, Agent, or Firm*—Jenkens & Gilchrist, P.C.

[57] ABSTRACT

A method and apparatus for providing a call circuit connection between a mobile station and a remote application host is disclosed. Once a call circuit connection is initially established between a mobile station and remote application host to enable data to transfer therebetween, the call circuit connection is monitored for detection of an idle condition. Upon detection of the idle condition, identifying information for the call circuit connection is stored, and a first portion of the call circuit connection is disconnected while maintaining a second portion of the connection. Upon a request for reconnection of the call circuit connection, the first portion of the call circuit connection is reestablished with the second portion to enable continued data transfer.

22 Claims, 4 Drawing Sheets

RADIO LINK SHORT HOLD MODE FOR MOBILE CIRCUIT DATA APPLICATIONS

BACKGROUND OF THE INVENTION

1. Technical Field of the Invention

The present invention relates to call circuit connections between wireless and wireline communication networks, and more particularly, to a method for maintaining a wireline portion of the call circuit connection while disconnecting a wireless portion of the call circuit connection during an idle period.

2. Description of Related Art

Circuit-switched data access has been available for some time within personal digital cellular (PDC) applications. Circuit-switched data access services provide the user with the ability to transmit data between a remote host location and a mobile station for display on an attached terminal device. A prime example of this would be the ability to provide a user wireless access to the Internet through a hand-held mobile station.

At present, widespread acceptance of circuit-switched data access has not been achieved. Reasons for this vary, but a prime reason involves the long setup time required to establish the circuit connection. In even modest data transfer situations, an end user must select between having very long session durations, which can be very expensive, or reconnecting each time a new batch of data must be downloaded and disconnecting after the data has been received, which is time consuming. Long setup times are expensive for the end user since they are charged for the time it takes to reestablish the connection to an application host. Some method for speeding the manner in which a user may connect or reconnect to a remote application and minimize the costs involved would greatly benefit the expansion of circuit switched data access available within PDC services.

SUMMARY OF THE INVENTION

The present invention overcomes the foregoing and other problems with a method and apparatus for controlling a call circuit connection between a mobile station and a remote application host. Initially, a call circuit connection is established between a mobile station and a remote application host. This is accomplished using a radio communications link between the mobile station and a base station transceiver. A mobile switching center (MSC) provides a communications link between the base station and an external network.

The communications link between the MSC and the external network is enabled using a connection with an interworking unit ((IWU)) that enables data to be transferred between the differing communication protocols of the external network and the public land mobile network (PLMN) including the base station, MSC and mobile station. The connections between the base station mobile switching center and interworking unit are referred to as the PLMN portion of the call circuit connection and the connection through the PSTN to the remote host application is referred to as the modem portion of the call circuit connection.

The interworking unit monitors the call circuit connection to detect the presence of an idle condition indicating that no data is presently being transmitted between the remote host application and the mobile station. In the preferred embodiment, this is accomplished by monitoring the ARQ frames within the call circuit connection. An idle condition is indicated by continuous retransmission of the last successfully transmitted frame (with unchanged frame numbers so the contents need not be checked).

Upon detection of the idle condition, the radio link and PLMN portions of the call circuit connection are disconnected. Identifying data for the call circuit connection consisting of identifying information for the mobile station, the number of the called party and an (IWU) line identifier are stored within a register of the mobile switching center for future reference. The PSTN portion of the call circuit connection between the MSC and the remote application host is maintained.

Upon receipt of a further call connection request from the mobile station, an initial determination is made of whether the connection request is to the previously accessed remote application host by comparing the request to the identifying data stored within the register of the MSC. If the call is not to the same host, the modem portion of the call circuit connection is dropped, and a new call circuit connection is established to the called number. If the connection request is to the previously accessed remote application host, the radio link and PLMN portions of the call circuit connection are reestablished with the modem portion of the call circuit connection to provide for further data transfer between the mobile station and the remote application host. In this way, a faster connection may be achieved while minimizing associated connection costs.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
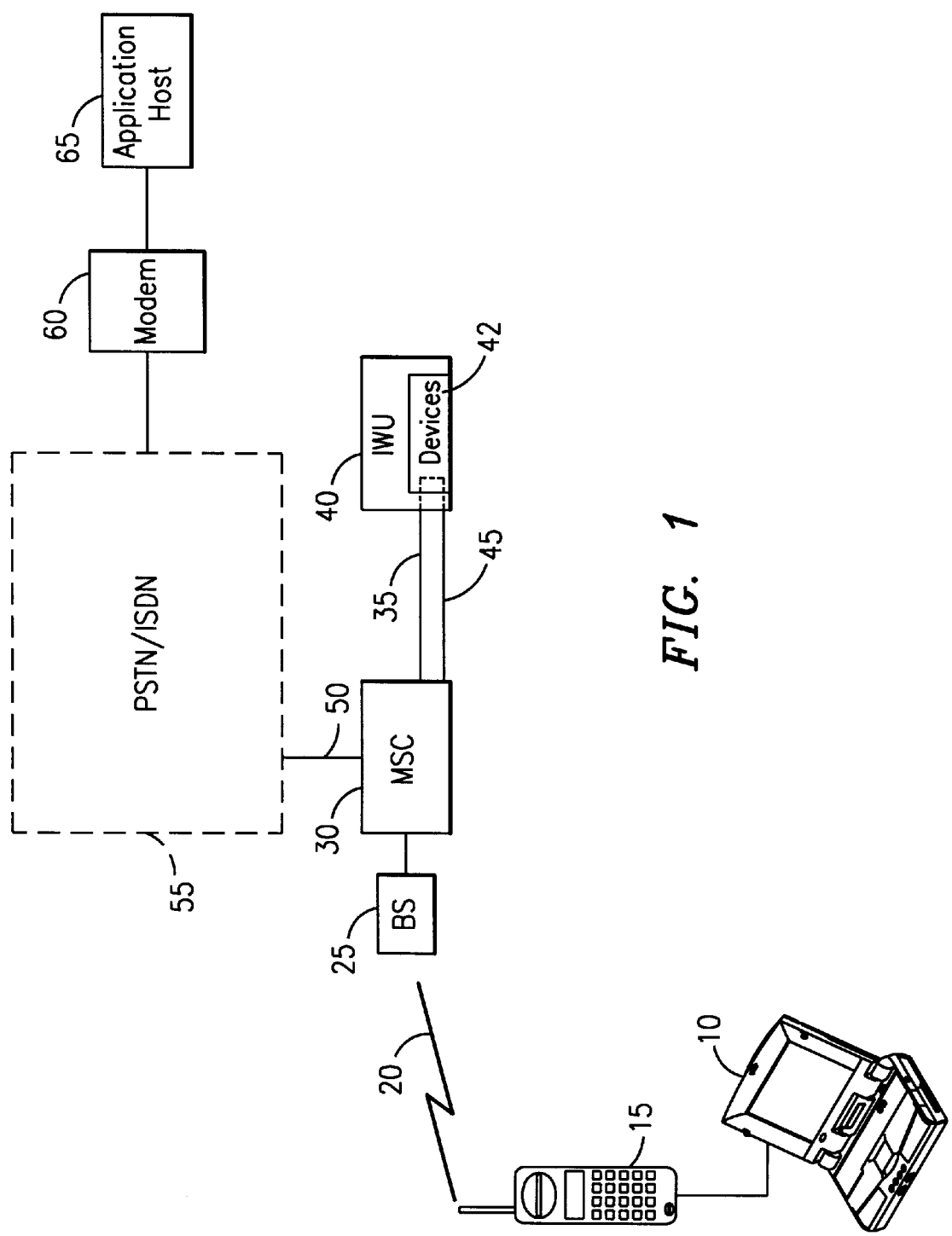
FIG. 1 is a block diagram illustrating a call circuit connection of data terminal equipment to a remote application host in a standard manner.

Referring now to FIG. 1, there is illustrated a block diagram of a method for interconnecting data terminal equipment 10 to a remote application host 65. Data terminal equipment 10, such as a personal computer or personal data assistant, generates a request for access to data or services provided by a remote application host 65 and transmits this request to an attached mobile station 15. The mobile station 15 generates a radio air interface connection 20 with a base station 25. The base station 25 transmits the connection request to the application host 65 through a mobile switching center (MSC) 30. The mobile switching center 30 recognizing that a connection between the wireless public and mobile network (PLMN) of which the mobile station 15 is a member and the public-switched telephone network/integrated services digital network (PSTN/ISDN) 55 containing the application host 65 must be made in order to complete the circuit connection.

In order to facilitate the call circuit connection between the wireless and wireline networks, which utilize differing communications protocols, the MSC 30 contacts via connection 35 an interworking unit ((IWU)) 40. The interworking unit 40 enables transmission and protocol adaptations between one telecommunications network, such as a connected PSTN/ISDN 55, and another, such as a public land mobile network. The (IWU) 40 may be located with the mobile switching center 30 serving a designated geographic area or may be implemented as a separate telecommunications node. The (IWU) 40 includes internal circuitry 42 enabling adaptation of transmissions and protocols between the PSTN/ISDN 55 and the PLMN containing the mobile station 15. The adapted protocol information is transmitted back to the MSC 30 via a connection 45.

With the help of the (IWU) 40, the MSC 30 establishes a connection to the PSTN/ISDN network 55 and subsequently to a modem 60 associated with the application host 65. In order for the user at the data terminal equipment 10 to maintain access to the application host 65, one of two situations must occur. The user must continuously maintain the circuit connection between the data terminal equipment 10 and the application host 65 by maintaining the radio air interface 20 and connections 50, 45, and 35, comprising the call circuit connection. This is quite expensive in the situation where a user may be accessing the application host 65 over a long period of time, such as when a user is surfing the Internet. Alternatively, the user of the data terminal equipment 10 may reestablish the connection each time additional data services must be accessed at the application host 65. This is time consuming and requires the user to pay for multiple connection times. During these connection times, the User is charged for establishing the connection and cannot work until the connection is reestablished.

Figure 2:
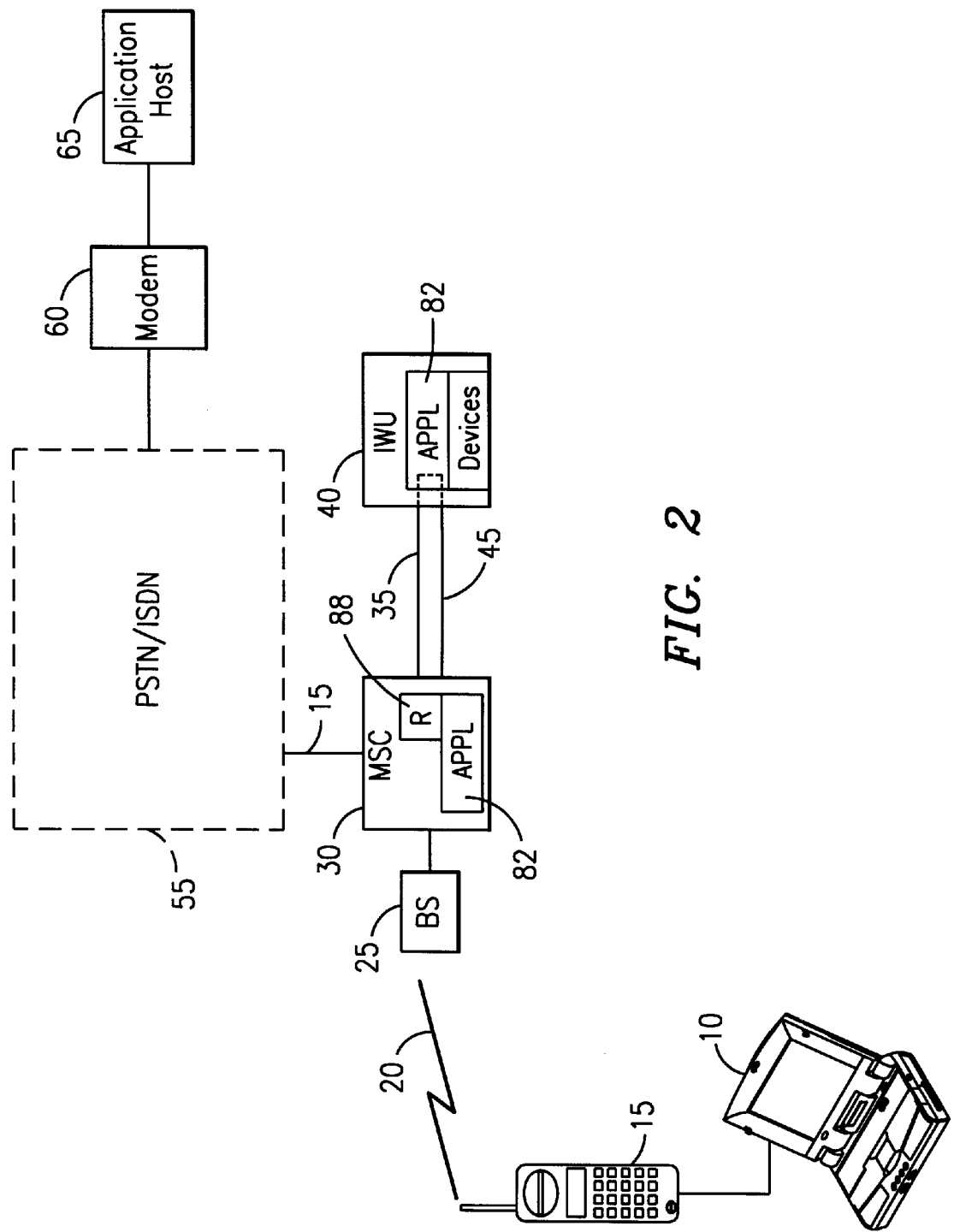
FIG. 2 is a block diagram illustrating a call circuit connection using the short hold mode of the present invention.
Figure 3:
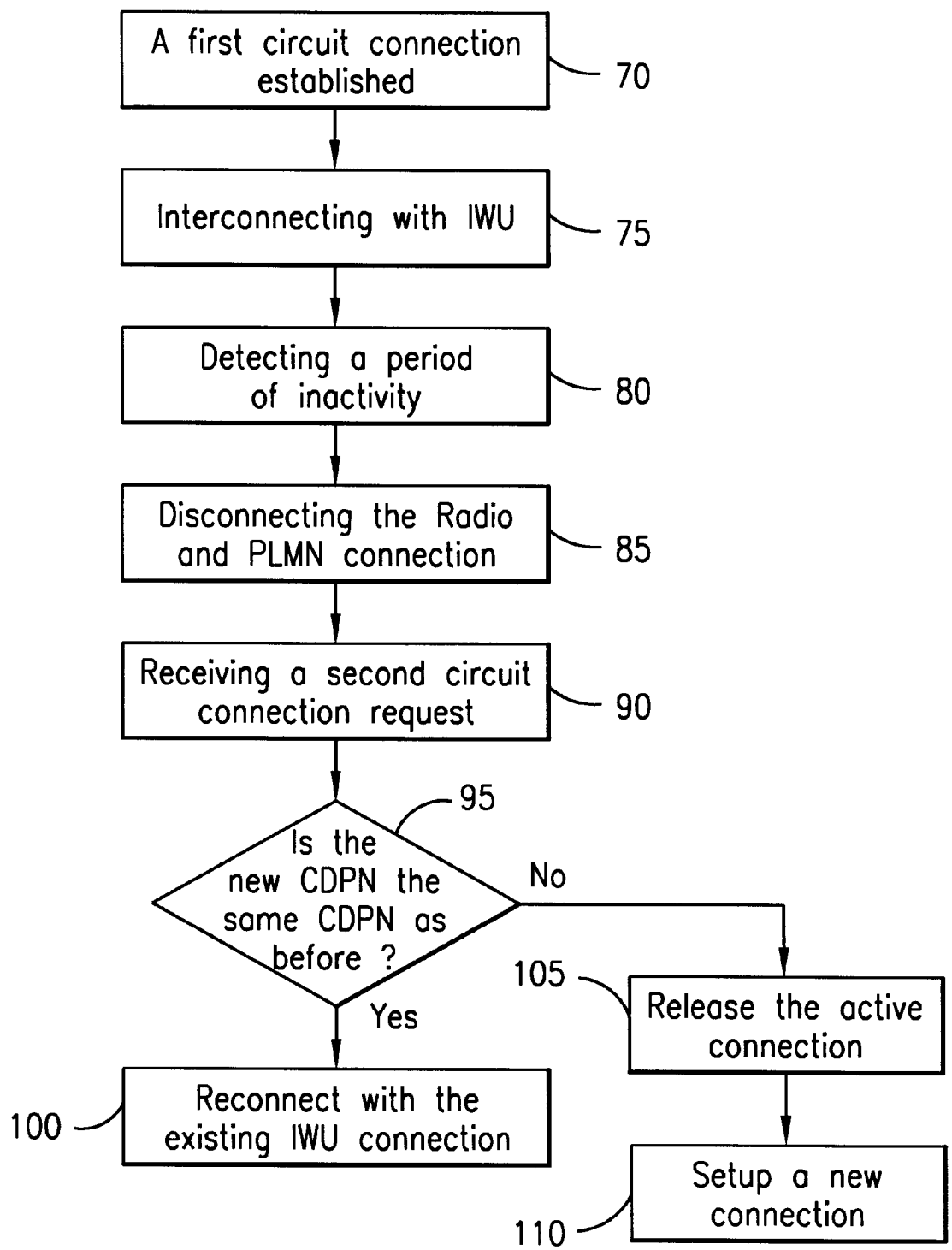
FIG. 3 is a flow diagram illustrating the method for disconnecting a call circuit connection upon detection of an idle condition and reconnection of the call circuit connection upon a request for further use of the connection.

Referring now to FIGS. 2 and 3, there are illustrated the method and apparatus for incorporating the present invention in the system of FIG. 1. Initially, a first circuit connection is established at step 70 between the data terminal equipment 10 and application host 65 as described previously with respect to FIG. 1. As part of this initial connection an interconnection is provided at step 75 with the (IWU) 40 to enable communication between the PLMN containing the mobile station 15, base station 25, mobile switching center 30, and the PSTN/ISDN 55 enabling connection to the application host 65.

After the initial call circuit connection has been established and any requested data downloaded to the data terminal equipment 10 from the application host 65, the interworking unit 40 monitors for a period of inactivity over the call circuit connection by examining the contents of ARQ protocol frames transmitted between the mobile station 15 and interworking unit 40. A monitoring application 82, which may be implemented in hardware or software, within both the mobile switching center 30 and interworking unit 40 monitor the ARQ protocol frames. The ARQ protocol frames enable automatic retransmission of data when an error is detected in a data stream.

The period of inactivity (timeout period) is indicated by the ARQ protocol frames by continuous retransmission of the last successfully transmitted from (with unchanged frame numbers, so the contents need not be checked). Alternative methods include transmitting a series of zeros indicating that the frames are idle or ceasing the transmission of ARQ protocol frames such that no frames would be detected. Once the timeout period is detected at step 80, the radio and PLMN portions are disconnected at step 85 up to the (IWU) 40. Thus, the air interface connection 20 between the mobile station 15 and base station 25 is discontinued. The connection 45 is maintained between the MSC 30 and (IWU) 40. The connection between the IWU 40 through the MSC 30 to the PSTN/ISDN network 55 is maintained as is the PSTN/ISDN network connection to modem 60 and application host 65.

The (IWU) 40 initiates disconnection through a signaling connection control part (SCCP) based signal, such as a mobile application part (MAP) signal. At the same time, information identifying the original circuit connection is stored within a register 88 of the MSC 30. The information stored in the register 88 includes, but is not limited to, the calling mobile station identifier/mobile station number (MSI/MSN), the called party (application host) number, and the (IWU) line identifier (e.g., T.1/E.1 trunk and slot ID. The connection remains idle until a second call circuit connection request is received at step 90.

Once a second call circuit connection request is received at step 90, a new call circuit connection is initiated using standard connection procedures. The MSC 30 compares at step 95 the MSI/MSN and the called party number of the new call connection request to the MSI/MSN and called party number information used in the first call circuit connection that are stored in register 88. If the same connection is requested, the call is routed to the existing modem connection with the application host 65 at step 100. If a different MSI/MSN or called party number is detected at inquiry step 95, the previous modem connection is released at step 105, and a new call circuit connection is established at step 110.

Reconnection of the existing (IWU) connection at step 100 occurs when the MSC 30 requests reestablishment of the radio air interface connection 20 and the PLMN connections 35 and 45 through a signaling connection control part (SCCP) based signal such as a MAP signal. In response to this request, the (IWU) 40 also reinitiates the ARQ protocol on the circuit connection (according to the (IWU) line identifier).

In order to avoid tying up system resources for extended periods of time, two additional mechanisms may optionally be included somewhere within the system. A long timer 112 (shown generally in phantom), established by the operator, may disconnect the modem connection if no traffic has been exchanged for a preselected period of time. Also, if the (IWU) 40 runs out of modem resources, the modem connection that has been idle for the longest period of time may be dropped.

Figure 4:
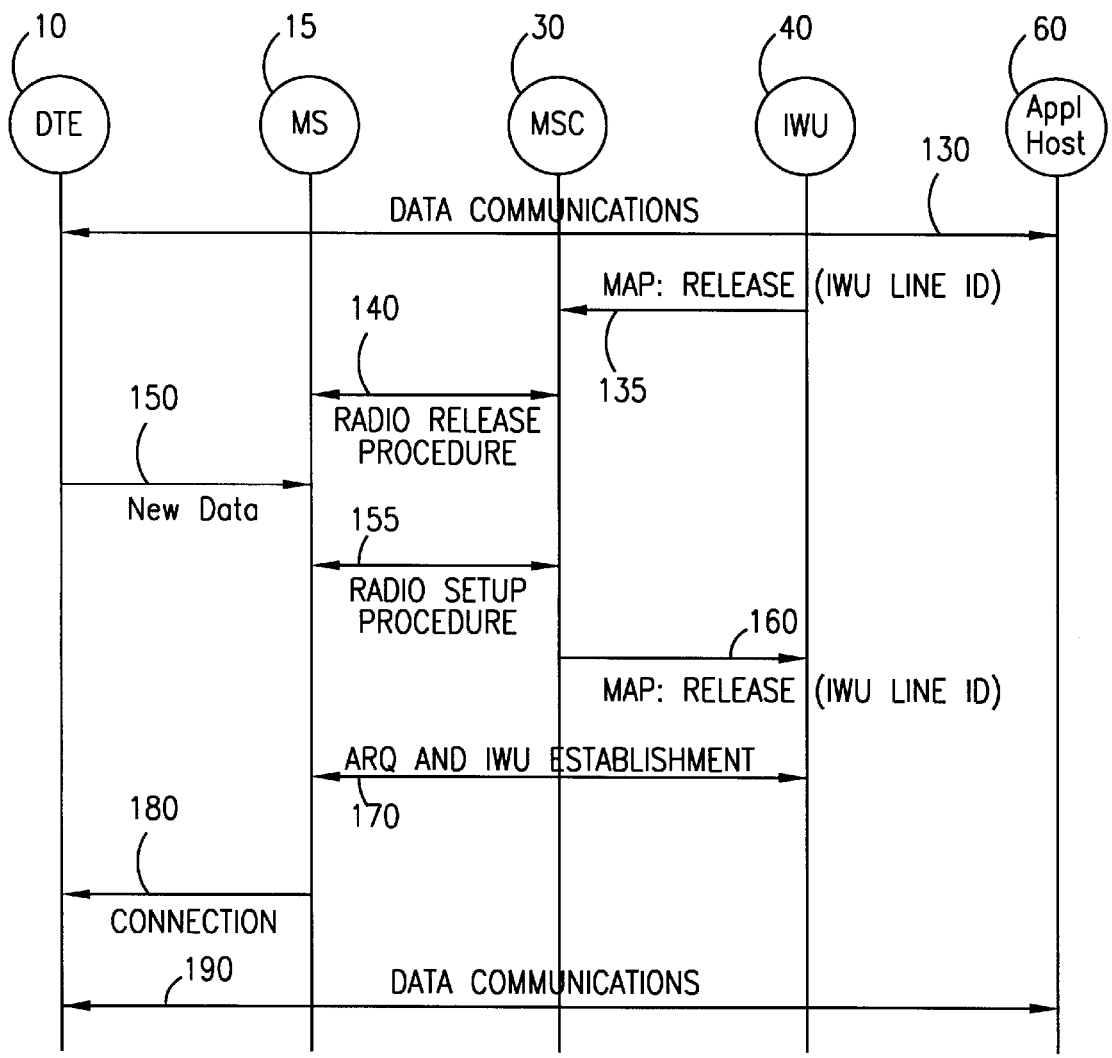
FIG. 4 is a signaling diagram illustrating the disconnection and reconnection procedures between the various units within the call circuit connection.

Referring now to FIG. 4, there is illustrated a signaling diagram describing the procedures for disconnection and reconnection of a call circuit connection between a mobile station 30 and an application host 65. Initially, a data communications mode is provided between the DTE 10 and application host 65 at 130. The data communications mode enables data transfers between the DTE 10 and application host 65. Once the (IWU) 40 detects a period of inactivity (timeout period) it requests the release of the radio link using a MAP signal at 135. The MSC 30 releases the radio link at 140 indicating to the MS 15 that this is a soft release, and the MS shall not perform a disconnect procedure towards the DTE 10. This is necessary to avoid having the DTE 10 application lose synchronization with the host application which is not notified of the disconnect. The MSC 30 then updates its register 88 with the call circuit connection identifying information. While the radio link is disconnected, the modem connection between the (IWU) 40 and the modem at the application host 65 is maintained.

The reconnection procedure is initiated by new data 150 being transmitted between the data terminal equipment 10 and mobile station 15. This initiates a radio connection setup procedure 155 between the mobile station 15 and MSC 30. Once the radio connection has been reestablished, the MSC 30 looks within its register 88 to determine if the calling MSN/MSI already has a modem connection associated with the called party number. If so, the MSC 30 transmits a MAP setup request 160 to the (IWU) 40 to reestablish an ARQ connection with the mobile station 15. The (IWU) 40 establishes an ARQ and (IWU) connection with the mobile station 15 at 170 in response to the setup request 160 and ties the connection with the maintained modem connection. This provides the connection 180 from the application host 65 to the data terminal equipment 10 through mobile station 15. Data communications 190 may then be carried out between the data terminal equipment 10 and application host 65 via the reestablished connection.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for providing a call circuit connection between a mobile station and a remote application host, comprising the steps of:
   establishing the call circuit connection including a first and second segment between the mobile station and the remote application host to enable the transmission of data therebetween;
   monitoring the call circuit connection for an idle condition;
   storing identifying data associated with the first segment of the call circuit connection upon detection of the idle condition, said data enabling reconnection of the first segment of the call circuit connection;
   disconnecting the first segment of the call circuit connection while maintaining the second segment of the call circuit connection in response to detection of the idle condition.

2. The method of claim 1 further including the steps of:
   receiving a request for reestablishing the call circuit connection with the second segment of the call circuit connection.

3. The method of claim 1 wherein the step of establishing further comprises the steps of:
   establishing the first segment of the call circuit connection from the mobile station to an interworking function; and
   establishing the second segment of a call circuit connection from the interworking function to the remote application host.

4. The method of claim 1 wherein the step of monitoring further includes the step of monitoring ARQ frames for an indication of the idle condition.

5. The method of claim 4 wherein the step of monitoring further includes the step of monitoring for continuous retransmission of an ARQ frame for indication of the idle condition.

6. The method of claim 1 wherein the step of disconnecting further includes the step of notifying the mobile station that the disconnection is in response to the idle condition.

7. The method of claim 1 wherein the step of disconnecting further includes the step of requesting disconnection of the first segment using a MAP signal.

8. The method of claim 1 further including the steps of:
   receiving a request for establishing a second call circuit connection;
   determining if the call circuit connection request is for the call circuit connection host associated with the stored identifying data;
   reestablishing the first segment of the call circuit connection with the second segment of the call circuit connection using the stored identifying data to reconnect the call circuit connection if the request is for the call circuit connection associated with the stored identifying data; and
   establishing a new call circuit connection if the request is to a new remote location.

9. The method of claim 8 wherein the first segment comprises a radio link.

10. The method of claim 8 wherein the step of reestablishing further includes the step of requesting reconnection of the first segment using a MAP signal.

11. The method of claim 1 wherein the identifying data includes at least one of the following: a calling MSI/MSN, called party number, and an interworking unit line identifier.

12. The method of claim 1 further including the step of disconnecting the second segment upon continuation of the idle condition and expiration of a preselected time-out period.

13. The method of claim 1 further including the step of disconnecting the second segment in response to a need for system resources utilized by the second segment.

14. A method for controlling a call circuit connection between a mobile station and a remote application host, comprising the steps of:
   establishing a call circuit connection between the mobile station and the remote application host to enable the transmission of data therebetween, the call circuit connection including a radio portion between the mobile station and a base station, a PLMN portion between the base station, a mobile switching center and an interworking unit; and a modem portion between the mobile switching center and the remote application host;
   monitoring the PLMN portion of the call circuit connection for an idle condition indicating no data is being transferred over the call circuit connection;
   storing identifying data associated with the first segment of the call circuit connection upon detection of the idle condition, said data enabling reconnection of the first segment of the call circuit connection;
   disconnecting the radio and PLMN portions of the call circuit connection in response to detection of the idle condition;
   receiving a request for reestablishing a call circuit connection; and
   reestablishing the radio and PLMN portions of the call circuit connection with the modem portion in response to the request.

15. The method of claim 14 wherein the step of monitoring further includes the step of monitoring ARQ frames for an indication of the idle condition.

16. The method of claim 14 wherein the step of monitoring further includes the step of monitoring for an absence of ARQ frames for an indication of the idle condition.

17. The method of claim 14 wherein the step of disconnecting further includes the step of storing identifying data associated with the radio and PLMN portions of the call circuit connection, the identifying data enabling reconnection of the radio and PLMN portions of the call circuit connection.

18. The method of claim 17 wherein the step of reestablishing further included the steps of:
   determining if the call circuit connection request is to the remote application host associated with the stored identifying data;
   reestablishing the radio and PLMN portions of the call circuit connection with the modem portion of the call circuit connection to reconnect the call circuit connection if the request is to the remote application host; and
   reestablishing a new call circuit connection if the request is to a new remote location.

19. The method of claim 14 further including the step of disconnecting the modem portion upon continuation of the idle condition and expiration of a preselected time-out period.

20. The method of claim 14 further including the step of disconnecting the modem portion in response to a need for system resources utilized by the second segment.

21. A system for providing a call circuit connection between a mobile station and a remote application host, comprising:

a base station for establishing a radio link portion of the call circuit connection with the mobile station;

a mobile switching center for establishing a first connection with the base station and for establishing a second connection with the remote application host;

an interworking function for establishing a third connection with the mobile switching center to enable data transfer between the mobile switching center and the remote application host;

means for disconnecting the radio link connection, the first connection and the third connection in response to detection of an idle condition within the call circuit connection and for reconnecting the radio link connection, the first connection and the third connection in response to a reconnection request; and means for storing identifying data associated radio link connection, the first connection and the third connection when they are disconnected.

22. The method of claim 21 wherein the identifying data includes at least one of the following: a calling MSI/MSN, called party number, and interworking unit line identifier.

* * * * *